United States Patent Office 3,132,083
Patented May 5, 1964

3,132,083
FUEL OIL COMPOSITION
James H. Kirk, Dyer, Ind., assignor, by mesne assignments, to Sinclair Research, Inc., New York, N.Y., a corporation of Delaware
No Drawing. Filed Oct. 2, 1958, Ser. No. 764,769
2 Claims. (Cl. 208—15)

This invention relates to a process for the production of petroleum distillate fuel oils of acceptable color and pour point.

Many petroleum stocks which could be considered suitable for diesel and heating fuels are limited in utility by the inability to meet certain specifications, for example, as to pour point. That is, these stocks do not pour readily at the low temperatures frequently encountered due to place or time of use. The high pour points that characterize these fuels may be substantially reduced to meet pour point specifications by incorporating into the heating fuels a small amount of a propane-insoluble heavy petroleum resin. However, use of the resinous additive as a pour depressor in the production of fuel oil distillates has been found to present undesirable off-color finished fuels. Attempts have been made to eliminate the objectionable color of the resin-containing finished fuel, as for example, by subjecting the raw petroleum resin to hydrodecolorization operations prior to its incorporation into the fuel oil distillate. These attempts have proved unsuccessful in that during the hydrodecolorization operation the pour depressor properties of the petroleum resin are invariably destroyed.

I have now found that a fuel oil distillate possessing both a substantially reduced pour point and acceptable color may be prepared by percolating through clay a blend of the oil-soluble propane-insoluble petroleum resin and a non-aromatic solvent and then adding certain cuts of the product from the percolation to a petroleum fuel oil distillate in amounts containing the equivalent to about 0.1% of the petroleum resin.

The petroleum resin additive in my invention is obtained as a propane-insoluble fraction from the propane treatment of reduced crude or bottoms fraction from a Pennsylvania or paraffin base crude oil. The resins have viscosities of about 3,000 to 12,000 SSU at 210° F. As the viscosity increases, their tendency to precipitate from the propane solution increases and advantage can be taken of this fact to effect a fractionation of the wide range resin and obtain any desired resin fraction, the preferred fraction having a viscosity of about 5,000 to 8,000 SSU at 210° F.

In carrying out my invention the petroleum resin additive is blended with a predominantly non-aromatic, liquid hydrocarbon solvent in the ratio of about 1–20 parts solvent to 1 part resin, preferably about 5–15 parts solvent to 1 part resin. The resin-solvent solution is percolated through a clay such as Attapulgus clay and certain fractions of the percolated product are then added to a fuel oil distillate in an amount containing the equivalent of about 0.1 percent of the petroleum resin. The determination of an amount of percolated product containing this equivalent of petroleum resin has as its basis the amount of petroleum resin incorporated in the non-aromatic solvent. Thus sufficient of the treated resin-solvent solution is added to give about 0.1 percent resin based on the weight of the resin in the solution fed to the treating operation.

In order to provide a fuel oil of the best pour and color characteristics, e.g. —25° F. or below pour point and an NPA color of less than 3½, the percolated product added to the fuel oil in amounts stated above must be carefully selected. Thus, the additive is composed of at least about 60% of the solution obtained in percolating the second to fourth barrels of resin per ton of clay but is no more than about 40% of the solution obtained in percolating the fourth and fifth barrels of resin per ton of clay. If the color specification is to be met a minor amount of the sixth barrel per ton might be tolerated; however substantially none of the solution after the sixth barrel should be used.

A fuel oil distillate containing the equivalent of about 0.1 percent of the petroleum resin from the first barrel of resin per ton of clay is found to be of acceptable color but has less pour depression than desired. On the other hand, the addition to a distillate fuel of fractions treated with the clay after my selected fractions are obtained results in a finished fuel of acceptable pour properties but of unacceptable color. Thus to obtain a finished fuel of both acceptable pour and color properties, the addition of my selected fractions is necessary.

An important factor in producing the product of the invention is the solvent employed. The solvent should be non-aromatic or predominantly non-aromatic liquid hydrocarbon, that is, containing less than about 25% aromatics, preferably less than about 10% aromatics. When aromatic solvents like benzene or toluene or solvents predominating in aromatics are used to put the resin of this invention into solution, clay treating of the resin solution has little decolorizing effect. Any solvent meeting the above limitations as to aromatic content and having a boiling point principally below about 400° F., preferably about 300° to 400° F. can be employed. Examples of suitable solvents are the non-aromatic or paraffinic solvents such as pentane, hexane, heptane and straight run products such as naphtha.

A clay useful in this invention is Attalpulgus clay or fuller's earth and other clays of similar properties. During contact the use of an elevated temperature, e.g. about 100 to 250° F. may aid handling.

Base fuel materials into which the treated resin solution is added to produce the novel product of this invention is characterized by boiling in a temperature range of about 300 to 750° F. Typical materials are the fuel oils generally known as distillate fuel oils. It must be understood, however, that this term is not restricted to straight run distillates. These fuels can be straight run distillate fuel oils, catalytically or thermally cracked distillate fuel oils or mixtures of straight run distillate fuel oils, naphthas and the like, with cracked distillate stocks. The cracked material frequently will be about 15 to 70 volume percent of the fuel.

The following examples are presented in order to further illustrate my invention. The physical properties of the heavy petroleum resin, fuel oil distillate, and the naphtha solvent employed in the examples are indicated in Table I.

Table 1

TESTS ON STOCKS

| | 300/400 Naphtha | Penn. Heavy Resin | Fuel (Neat)[1] |
|---|---|---|---|
| Gravity, °API | 48.3 | 13.5 | 37.2 |
| Flash, °F | 106 (PM) | 680 (COC) | 152 (PM) |
| Fire | | 740 | |
| Viscosity at 100° F. (SUS) | 28.7 | | 34.0 |
| Viscosity at 210° F. (SUS) | | 7745 | |
| Cloud Point, °F | —66 | | 6 |
| Pour Point, °F | B-80 | | 5 |
| Color | 1-NPA | 61,580(OD) | 1-NPA |
| Carbon Residue (cc.) | | 12.76 | 0.18 |
| Sulfur, Percent | 0.026 | 0.31 | |
| Ash, Percent | | 0.258 | |
| Distillation: | | | 365 |
| IBP, °F | 317 | | 613 |
| 95% | 398 | | |

[1] Composed of 80% straight run and 20% cracked distillates.

EXAMPLE I

A feedstock composed of ten volume percent of a Pennsylvania heavy resin having the physical properties shown in Table I and 90 volume percent of naphtha whose physical properties are also shown in Table I was prepared. This feedstock was percolated through 30–60 mesh Attapulgus clay in a steam (212° F.) jacketed tower at a rate of two barrels per ton of clay per hour. The product was collected in cuts of ten barrels per ton of clay. A series of fuel oil blends were prepared having added thereto the individual cuts from the percolation unit, each fuel blend containing 0.1 percent resin based on the feed to the percolation unit. The physical properties of the fuel oil used are shown in Table I above. The results of tests on the series of fuel oil blends prepared are listed in Table II.

Table II

| Percolation Cut No. | Bbls. Feed Per Ton | Equiv. b./t. Penn. Heavy Resin | Ml. Percol. Cut/ 100 ml. Fuel | Equiv. Percent Penn. Heavy Resin | Cloud, °F. | Pour, °F. | Color NPA |
|---|---|---|---|---|---|---|---|
| Neat Fuel Feed | | | | | 6 | 5 | 1– |
| 1 | 0–10 | 1st | 1.0 | 0.1 | 4 | B–30 | 5– |
| 2 | 10–20 | 2nd | 1.0 | 0.1 | 6 | –20 | 2– |
| 3 | 20–30 | 3rd | 1.0 | 0.1 | 6 | –25 | 3– |
| 4 | 30–40 | 4th | 1.0 | 0.1 | 6 | B–30 | 3½– |
| 5 | 40–50 | 5th | 1.0 | 0.1 | 8 | B–30 | 4– |
| 6 | 50–60 | 6th | 1.0 | 0.1 | 8 | B–30 | 4– |
| 7 | 60–70 | 7th | 1.0 | 0.1 | 4 | B–30 | 4– |
| | | | | | 4 | B–30 | 4½– |

*Conditions: Feed—10 volume percent Penn. Heavy Resin in 300/400 naphtha; Clay— Attapulgus 30–60 mesh; Rate—2 barrels feed/ton clay/hour; Temp.—212° F.; Cuts—10 barrels/ton.

The tests in Table II show that although a significant amount of pour depressor was retained in all the cuts the first barrel of resin was not sufficiently effective, and the specification color of 3 NPA maximum was met by the addition of the equivalent of 0.1 percent resin from the first 2 cuts only.

EXAMPLE II

The feedstock of Example I was treated as in Example I and the product collected in cuts of ten barrels per ton of clay. Fuel oil blends were prepared from composites of the various cuts, each composite containing the equivalent of 10.0 percent resin. Tests on the fuel oil blends prepared are listed in Table III.

Table III

| Percolation Cut No. | Bbls. Feed Per Ton | Equiv. b./t. Penn. Heavy Resin | Ml. Percol. Cut/ 100 ml. Fuel | Equiv. Percent Penn. Heavy Resin | Cloud, °F. | Pour, °F. | Color NPA |
|---|---|---|---|---|---|---|---|
| Neat Fuel Feed | 0 | 0 | | | 6 | 5 | 1– |
| 1 | 0–10 | 0–1 | 1.0 | 0.1 | 4 | B–30 | 5– |
| 1–2 | 0–20 | 0–2 | 1.0 | 0.1 | 6 | –20 | 2– |
| 1–3 | 0–30 | 0–3 | 1.0 | 0.1 | 4 | –20 | 2½– |
| 1–4 | 0–40 | 0–4 | 1.0 | 0.1 | 8 | –25 | 3– |
| 1–5 | 0–50 | 0–5 | 1.0 | 0.1 | 6 | B–30 | 3 |
| 1–6 | 0–60 | 0–6 | 1.0 | 0.1 | 8 | –25 | 3½– |
| 1–7 | 0–70 | 0–7 | 1.0 | 0.1 | 8 | –30 | 3½ |
| | | | | | 6 | B–30 | 3½ |

*Conditions: Feed—10 volume percent Penn. Heavy Resin, 90 volume percent 300/400 naphtha; Clay—Attapulgus 30–60 mesh; Rate—2 barrels feed/ton clay/hour; Temp.—212° F.; Cuts—10 barrels product/ton clay.

Inspection of these data shows that the most favorable results are obtained when the percolated product added to the fuel oil is taken from the composite of the first four cuts. The fuel oil blend produced by the addition of the equivalent to 0.1 percent heavy resin of this composite to the fuel oil employed gave an NPA color of three NPA maximum and displayed a pour point of below 30° F. The addition of a percolated product of the first three cuts is also shown to give a color of three NPA and to display a satisfactory pour point of —25° F. Use of a composite of the first five or more cuts, however, although producing a fuel oil blend of acceptable pour properties fails to produce a fuel oil blend meeting the color specification of NPA 3.

An overall examination of the data in Tables II and III demonstrates that per ton of clay employed there is a tendency during the percolation of the initial 2 barrels of resin for the clay to also absorb substantial amounts of the depressor resin as well as to decolorize the resin-solution to the extent that a color of NPA 3 will be met in the finished fuel. Conversely, after about 3 barrels have been percolated through the ton of clay, the absorptive strength of the clay has been expended to the point where the barrels of resin solution subsequently percolated lose very little of the pour depressor and the removal of the color bodies in the resin solution is not sufficient to produce a finished fuel having colors of NPA 3. It can be seen therefore, that the point in the percolation process at which there is little loss of the pour depressor resin and decolorization to the extent that a finished fuel both of acceptable color and pour properties may be produced is during the time when the second and third barrel fractions are percolated. This fact is demonstrated in Table III wherein the composite producing the most favorable results (i.e. the composite of the first 4 barrels percolated) contains about 50% of the second and third barrel fractions. Inclusion of the fourth barrel of resin is seen to compensate for the pour depressor loss exhibited by the first barrel. It should also be pointed out that the addition of the equivalent of substantially less than about 0.1 percent resin, for example 0.05 resin from even the second and third barrels, although meeting the color specification of 3 NPA fails to provide a fuel oil of —25° F. or below pour point.

I claim:
1. A fuel oil having a pour point of —25° F. or below and an NPA color of 3 maximum consisting essentially of a distillate fuel oil boiling in the range of about 300 to 750° F. and a clay percolated solution consisting essentially of an oil-soluble, propane-insoluble, paraffin base-derived resinous petroleum fraction having a viscosity of about 3,000 to 12,000 at 210° F. and a predominantly non-aromatic liquid hydrocarbon solvent boiling principally below about 400° F. and having less than about 25% aromatics in a ratio of about 1 to 20 parts solvent to 1 part resin, said percolated solution being composed of at least about 60% of the solution obtained in percolating the second to fourth barrels of said resin per ton of clay and no more than about 40% of the solution obtained in percolating the fourth and fifth barrels of said resin per ton of clay, and said percolated solution being present in an amount of about 0.1 percent of said resin based on the weight of the resin in the solution percolated.

2. The composition of claim 1 wherein the resinous petroleum fraction has a viscosity of about 5,000 to 8,000 SUS at 210° F.

References Cited in the file of this patent

UNITED STATES PATENTS

| | | |
|---|---|---|
| 2,075,410 | Thompson | Mar. 30, 1937 |
| 2,447,732 | Campbell et al. | Aug. 24, 1948 |
| 2,664,388 | Winterhalter | Dec. 29, 1953 |
| 2,726,192 | Kieras | Dec. 6, 1955 |
| 2,727,847 | Hunn | Dec. 20, 1955 |
| 2,864,498 | Mathews et al. | Dec. 16, 1958 |

FOREIGN PATENTS

| | | |
|---|---|---|
| 782,853 | Great Britain | Sept. 11, 1957 |